(12) United States Patent
Ferlin et al.

(10) Patent No.: US 9,783,002 B2
(45) Date of Patent: Oct. 10, 2017

(54) TIRE FOR A HANDLING VEHICLE

(75) Inventors: Olivier Ferlin, Clermont-Ferrand (FR); Gérard Bor, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 287 days.

(21) Appl. No.: 14/009,412

(22) PCT Filed: Apr. 12, 2012

(86) PCT No.: PCT/EP2012/056650
§ 371 (c)(1),
(2), (4) Date: Dec. 9, 2013

(87) PCT Pub. No.: WO2012/140121
PCT Pub. Date: Oct. 18, 2012

(65) Prior Publication Data
US 2014/0090758 A1 Apr. 3, 2014

(30) Foreign Application Priority Data
Apr. 14, 2011 (FR) .................................... 11 53247

(51) Int. Cl.
*B60C 5/00* (2006.01)
*B60C 19/00* (2006.01)
(Continued)

(52) U.S. Cl.
CPC ............ *B60C 5/00* (2013.01); *B29D 30/0061* (2013.01); *B29D 30/04* (2013.01); *B60C 5/002* (2013.01);
(Continued)

(58) Field of Classification Search
CPC .......... B60C 5/004; B60C 19/12; B29D 30/04
See application file for complete search history.

(56) References Cited

U.S. PATENT DOCUMENTS

| 1,097,824 A | | 5/1914 | Staten | |
| 2,109,383 A | * | 2/1938 | Gallardo | ............... B29C 73/163 152/157 |

(Continued)

FOREIGN PATENT DOCUMENTS

| CA | 1160407 | * | 1/1984 |
| CN | 2567064 Y | | 8/2003 |

(Continued)

OTHER PUBLICATIONS

Machine translation of DE 811194, 1951.*
(Continued)

*Primary Examiner* — Justin Fischer
(74) *Attorney, Agent, or Firm* — Dickinson Wright PLLC

(57) ABSTRACT

A tire for a handling vehicle, designed to transport heavy loads, over short distances and at low speeds, and a mounted assembly consisting of a tire mounted on a rim. Also, a method for producing such a mounted assembly. A mounted assembly includes a tire mounted on a rim, having a tread designed to come into contact with a ground, two sidewalls extending radially inwards from the ends of the tread, and two beads extending the sidewalls radially inwards and in contact with the rim, an internal cavity containing a filling component consisting of at least one incompressible solid element, and which is a granular filling component consisting of granules at least partly separated from one another by interstices containing at least gas, and the fill rate, which is the ratio between the total volume of the granules, the total of the elementary volumes of the granules, and the volume of the internal cavity, is at least equal to 0.8.

1 Claim, 3 Drawing Sheets

(51) Int. Cl.
*B29D 30/04* (2006.01)
*B29D 30/00* (2006.01)

(52) U.S. Cl.
CPC ... *B60C 2200/065* (2013.01); *Y10T 29/49494* (2015.01); *Y10T 152/10036* (2015.01)

(56) References Cited

U.S. PATENT DOCUMENTS

| | | | |
|---|---|---|---|
| 2,884,039 A * | 4/1959 | Hicks | B60C 5/005 |
| | | | 152/450 |
| 3,022,810 A | 2/1962 | Lambe | |
| 3,230,999 A | 1/1966 | Hicks | |
| 3,381,735 A | 5/1968 | Talcott et al. | |
| 3,866,652 A | 2/1975 | Ahmad | |
| 3,907,018 A | 9/1975 | Fujikawa et al. | |
| 4,060,578 A | 11/1977 | Kisbany | |
| 6,578,613 B1 | 6/2003 | O'Coin | |
| 6,969,469 B1 * | 11/2005 | Xie | B01D 24/12 |
| | | | 210/290 |
| 7,678,216 B2 | 3/2010 | Sandstrom et al. | |

FOREIGN PATENT DOCUMENTS

| | | | |
|---|---|---|---|
| CN | 2 616 410 Y | | 5/2004 |
| CN | 201669899 | * | 12/2010 |
| DE | 8111194 | * | 8/1951 |
| DE | 10041033 | * | 3/2002 |
| GB | 190813532 | * | 12/1908 |
| JP | 57-58501 A | | 4/1982 |
| JP | 2001-252989 A | | 9/2001 |
| JP | 2004-174844 | * | 6/2004 |
| JP | 2004-237616 A | | 8/2004 |
| SU | 1123877 | * | 11/1984 |
| WO | WO 97/03850 A1 | | 2/1997 |

OTHER PUBLICATIONS http://weather.about.com/od/n/g/nitrogen.htm, no date.*
Japanese Office Action issued in corresponding Japanese Patent Application No. 2014-504316.
Chinese Office Action for concurrent application CN100738 dated Apr. 22, 2015.

* cited by examiner

TIRE FOR A HANDLING VEHICLE

BACKGROUND

1. Field

Disclosed herein is a tire for a handling vehicle, designed to transport heavy loads, over short distances and at low speeds, such as, for example, a materials-handling vehicle used in an underground mine. It relates more precisely to a mounted assembly consisting of a tire mounted on a rim.

A further subject of the invention is a method for producing such a mounted assembly.

2. Description of Related Art

Handling vehicles are often equipped with solid tire instead of conventional inflated tires. A solid tire is an object of toroidal shape, most frequently made of rubber, designed to be mounted on a wheel, but with no internal cavity designed to be inflated with an inflation gas. The load applied to the solid tire is supported by the structure of the solid tire.

A solid tire has a certain number of advantages over an inflated tire. First, because there is no inflation gas, it can neither deflate nor burst, which ensures an advantage in terms of reliability and safety. Then, a solid tire, because of its damping capacity that is greater than that of an inflated tire, contributes to better dynamic stability of the handling vehicle during loading and unloading operations which cause dynamic load transfers between the front and rear axles of the vehicle. Moreover, a solid tire has a considerable load capacity because of its high vertical rigidity and a reduced space requirement relative to an inflated tire having the same load capacity. Finally, a solid tire requires reduced maintenance: because there is no inflation gas, there is no pressure to check.

On the other hand, a solid tire has certain drawbacks relative to an inflated tire with the same load capacity. First, a solid tire has a higher weight because of its solid structure. Moreover, its solid structure dissipates more heat, in use under the action of the mechanical stresses, which implies constraints of usage under load, speed and duration of use. Its service life with respect to wear is less than that of an inflated tire because the distribution of the pressures on the ground, in the contact surface with the ground of the tread of the solid tire, is less optimized. It costs more to manufacture because of a greater volume of material. Its environmental impact is considerable, because a worn solid tire, at the end of life, constitutes a heavy and voluminous waste product that is more difficult to recycle. Finally, the mounting of a solid tire on a rim may require specific mounting equipment that is essential for ensuring sufficient tightness on the rim to provide an effective transmission of torque.

A conventional tire comprises a tread designed to come into contact with a ground, two sidewalls extending radially inwards from the ends of the tread, and two heads extending the sidewalls radially inwards and in contact with a rim. When it is mounted on a rim to form a mounted assembly, the tread, the two sidewalls, the two beads and the rim delimit an internal cavity.

A conventional tire, of which the internal cavity is at least partly filled by a solid filling component, is a worthwhile alternative to the solid tire. Various technical solutions of this type have been proposed.

A first family of technical solutions is based on a filling of the internal cavity of the tire with concentric layers of polymeric materials. Documents WO 9703850 and U.S. Pat. No. 6,578,613 describe a tire of which the internal cavity is filled with a solid filling component consisting of concentric layers of polymeric material optionally comprising expansion joints. Document U.S. Pat. No. 7,678,216 proposes a tire of which the internal cavity contains a core made of solid material enveloped in an elastomeric foam.

A second family of technical solutions is based on a filling of the internal cavity of the tire with a material of the polymeric foam type comprising cavities or cells. U.S. Pat. Nos. 3,022,810, 3,381,735, 3,866,652, 3,907,018 and 4,060,578 describe tires of which the internal cavity is filled with a cellular elastomeric foam material of which the cells optionally contain a pressurized gas.

A third family of technical solutions is based on a filling of the internal cavity of the tire with particles of rubber mixed with a linking agent, before insertion into the tire, the mixture being designed to harden, in particular by curing, in order to form a one-piece solid filling component. Document U.S. Pat. No. 1,097,824 discloses a tire of which the internal cavity is filled with elastic solid particles such as particles of vulcanized rubber, connected together permanently by a linking material, such as a vulcanized rubber cement. Document JP 57058501 describes a solid tire made from a tire filled with a vulcanized mixture of rubber powder and liquid polyurethane, Documents JP 2001252989 and JP 04088168 describe methods for manufacturing a solid tire based on a conventional tire by filling the latter with recycled rubber powder which is mixed, before insertion into the tire, with a linking agent such as for example a polyurethane or phenol resin, the mixture thus formed being hardened, inside the tire, to form a one-piece filling component.

The foregoing technical solutions all describe a solid filling component of the internal cavity of the tire, consisting either of a one-piece element, such as a cellular polymeric foam or a vulcanized mixture of rubber particles, or of a limited number of elements, such as concentric layers of polymeric material. The design and manufacture of such solid filling components however have a certain degree of complexity.

Furthermore, the solid filling component has a mechanical rigidity which, with the structural rigidity of the tire on its own, contributes to the vertical rigidity of the tire filled with the filling component. The choice of the rigidity of the solid filling component makes it possible to adjust the vertical rigidity of the tire filled with the solid filling component, hence the relative flexing of the tire, for a given vertical load applied to the tire, to the desired level. The relative flexing of the tire is defined by the ratio of the variation of the radial height of the tire over half the difference between the external diameter of the tire and the maximum diameter of the rim measured on the edge of the rim, the external diameter of the tire being measured while static in an unloaded state.

After adjusting the rigidity of the solid filling component in order to obtain the desired vertical rigidity of the tire, it is difficult to change it, for example if there is a significant variation in the vertical load applied to the tire, without totally changing the solid filling component.

SUMMARY

There remains a need for a filling component that is easy to apply, for a tire of a mounted assembly of a handling vehicle, designed to transport heavy loads, over short distances and at low speeds, and to allow an easier adjustment of the vertical rigidity of the tire by adjusting the rigidity of the filling component.

This object is achieved by a mounted assembly for a handling vehicle, designed to transport heavy loads, over short distances and at low speeds, comprising:

a tire mounted on a rim, the tire comprising a tread designed to come into contact with a ground, two sidewalls extending radially inwards from the ends of the tread, and two beads extending the sidewalls radially inwards and in contact with the rim, the tread, the two sidewalls, the two beads and the rim delimiting an internal cavity, the internal cavity containing a filling component consisting of at least one incompressible solid element, the filling component being a granular filling component consisting of granules at least partly separated from one another by interstices containing at least one gas, the fill rate, which is the ratio between the total volume of the granules, the total of the elementary volumes of the granules, and the volume of the internal cavity, being at least equal to 0.8.

A filling component, by definition, is designed to fill at least partly the internal cavity of the tire. A granular filling component consists of granules which are small-sized particles, consisting of an incompressible material and being able to move relative to one another. A small-sized particle has an elementary volume much smaller than the volume of the internal cavity of the tire, at most equal to $10^4$ times the volume of the internal cavity and at least equal to $10^{-7}$ times the volume of the internal cavity. As an example, for an internal cavity of which the volume is equal to $40 \cdot 10^{-3}$ m$^3$, an elementary volume of granule of 1 cm$^3$ is equal to $0.25 \cdot 10^{-4}$ times the volume of the internal cavity and an elementary volume of granule of 1 mm$^3$ is equal to $0.25 \cdot 10^{-7}$ times the volume of the internal cavity. An incompressible material, which, by definition, has a volume that is not diminished by an increase in the pressure, may be either flexible, such as rubber, or rigid, such as sand.

The granules are at least partly separated from one another by interstices containing at least one gas. Because of its shape, a granule is in contact over only a portion of its external surface with the adjacent granules, hence the existence of interstices between the granules. When the internal cavity of the tire is filled with granules, the atmospheric air is trapped in the interstices between the granules. Furthermore, it is also envisagable to inflate the tire after filling the internal cavity of the tire with the granules, the inflation gas then being distributed in the interstices and having a pressure higher than atmospheric pressure, for example the pressure of use of the tire, as recommended by the ETRTO (European Tire and Rim Technical Organisation) standards.

Since the volume of the internal cavity of a tire is substantially constant, in the conditions of use of the tire, the inventors have shown that a fill rate, defined as the ratio between the total volume of the granules, the total of the elementary volumes of the granules, and the volume of the internal cavity, at least equal to 0.8 ensures a vertical rigidity of the tire, with a granular filling component, that is at least equal to the vertical rigidity of the same tire, with no granular filling component, and inflated to the pressure of use of the tire for a given usage load.

A fill rate below 0.8 leads to a vertical rigidity that is too low for an optimal operation of the tire, similar to that of an insufficiently inflated tire.

The fill rate is obtained by compacting the granules inside the internal cavity of the tire. The compacting consists in applying a pressure to the granular filling component so as to reduce the volume of the interstices between the granules. The smaller the elementary volume of granule, the smaller the volume of the interstices between the granules and the less necessary it is to compact the granular filling component to achieve the intended fill rate.

A tire, of which the internal cavity is filled with a granular filling component, and which is subjected to mechanical running stresses, has a mechanical behaviour that differs from that of a solid tire or of a tire of which the internal cavity is filled with a solid filling component, and from that of a conventional inflated tire.

In the case of a solid tire, or of a tire with a solid filling component, the vertical load applied to the tire is absorbed by solid compression of the solid tire or of the solid filling component. The change in the load applied to the tire as a function of the flexing of the tire is substantially linear.

In the case of a conventional inflated tire, the vertical load applied to the tire is absorbed by the structure of the tire and the inflation gas. The vertical rigidity of the tire therefore results from the structural rigidity of the tire and from the pneumatic rigidity due to the inflation gas. The change in the load applied to the tire as a function of the flexing of the tire is substantially linear, but, most frequently, with a gentler slope than in the case of a more rigid solid tire.

In the case of a tire with a granular filling component, the vertical load applied to the tire is absorbed by the compression of the granular filling component which is a function of the fill rate of the internal cavity of the tire. The higher the fill rate, the less compressible the volume of the granular filling component. The change in the load applied to the tire as a function of the flexing of the tire is greatly nonlinear. For small loads, the flexing rapidly increases due to the compaction of the granular filling component when running, a function of the elementary volume of the granules and of the fill rate. At higher loads, the change in flexing reduces greatly due to the incompressibility of the material constituting the granules of the highly compacted granular filling component, the mechanical behaviour of the tire tending towards that of a solid tire.

The behaviour of a tire with a granular filling component results notably, but not exclusively, from the characteristics of incompressibility of the granules, from the low shear strength of the granular filling component and from the various specific complex phenomena of the granular environments, such as the friction or the coalescence between the grains.

A granular filling component is advantageously uniform, that is to say consisting of granules of the same material and of similar sizes. "Similar sizes" means elementary volumes of granules varying between a minimum elementary volume and a maximum elementary volume that is close, for example at most equal to 1.2 times the minimum elementary volume.

The granules of the granular filling component consist preferably of cheap materials. Granules made of cheap flexible material originate, for example, from the recycling of the shredding and grinding of rubber treads of tires. Granules made of cheap rigid material are for example grains of sand.

The fill rate is advantageously at least equal to 0.95. This high fill rate characterizes a tire of which the internal cavity is perfectly filled. This perfect filling ensures a rigidity of the granular filling component even for low loads. On the other hand, if the tire is not perfectly filled, the vertical rigidity is originally very low as in the case of an uninflated tire.

According to a first embodiment, the granules of the granular filling component are advantageously elastic. When the load is no longer applied to the tire, the granular filling component thus resumes its initial shape, which ensures the stability of the shape of the tire over time.

According to a first variant of the first embodiment, the elastic material forming the granules of the granular filling component advantageously has a modulus of elasticity at 10% of elongation, at most equal to 100 MPa, characteristic of a highly deformable material, such as, for example, an elastomer-based polymeric material. By definition, the modulus of elasticity at 10% of elongation is the tensile stress measured for an elongation of 10% of a test specimen of said material. In the case of an elastomer-based polymeric material, the characteristics of stress as a function of the tensile deformation of said material, after curing, are determined by tensile tests, on a test specimen, according to a method known to those skilled in the art, for example according to the international standard ISO 37, and in normal temperature conditions (23+ or −2° C.) and normal hygrometry conditions (50+ or −5% relative humidity), defined by international standard ISO 471.

According to a second preferred variant of the first embodiment, it is advantageous to choose, amongst the elastic materials, granules consisting of a polymeric material, and, preferably, an elastomer-based polymeric material. Specifically, it is worthwhile, from an economic and environmental point of view, to use as materials recycled rubbers from tires which are elastomer-based polymeric materials, such as retreading powder or partially or totally ground up tires. The retreading powder is obtained by grinding up tire treads originating from retreading. If necessary, it is possible to use an elastomer-based polymeric material specifically designed for use as granules, for example, with the lowest possible hysteresis level in order to limit the dissipation of heat in the granules.

According to a third variant of the first embodiment, the interstices between the granules contain a heat-conducting powder, preferably having a thermal conductivity at least equal to 50 W/m·K. This heat-conducting powder makes it possible to distribute the dissipated heat in the granular filling component. Specifically, the granules, by reason of their frictional contacts, between them and with the wall of the internal cavity, dissipate heat or calorific energy. Moreover, the deformations of the granules also generate heat. This therefore prevents the creation of hot spots capable of damaging the granules and hence the rigidity of the granular filling component.

In a fourth variant of the first embodiment, the interstices between the granules advantageously contain a powder interacting with the granules, in order to create chemical links making it possible to limit the relative mutual mobility of the granules. These chemical links are created by raising the temperature inside the granular filling component, generated by the mechanical stresses exerted on the tire during its use when running.

Finally, in a fifth variant of the first embodiment, it is advantageous that the interstices between the granules contain a viscous product having a high viscosity. The viscosity of the product must be low enough for the latter to be in the fluid phase, during its insertion into the granular filling component, via the rim valve of the mounted assembly. But this viscosity must be high enough for the product not to flow, after its insertion, to the outside of the rim, in the case of an unsealed rim. This viscous product is used to adjust the rigidity of the tire after the placement of the rest of the granular filling in the internal cavity of the tire. Moreover, it can be envisaged to use a viscous product which solidifies in the granular filling component, creating at least locally agglomerations of granules, which also contributes to increasing the rigidity of the tire.

In a second embodiment, the granules of the granular filling component consist of an undeformable material. Because of their undeformability, the undeformable or rigid granules do not intrinsically generate heat. Moreover, the granular filling component, consisting of undeformable granules, after a stabilization phase in the compacting of the granules, advantageously retain a constant volume throughout use, which prevents carrying out additional filling of the internal cavity throughout the life of the tire. A large variety of undeformable materials can be envisaged, such as, as an example and not exclusively, minerals such as sand or glass.

A preferred variant of the second embodiment is to choose grains of sand as granules. Sand, which is a cheap material, exists in the form of various particle sizes, that is to say with various grain sizes. The choice of a suitable particle size makes it possible to more easily adjust the fill rate as a function of the intended vertical rigidity of the tire.

During the filling of the internal cavity of the tire, atmospheric air is naturally trapped in the interstices between the granules. In the particular case of a sealed rim, it is advantageous, according to a third embodiment of the invention, to inflate the tire with an inflation gas such as air or nitrogen, such that the interstices between the granules are filled with a gas of which the pressure is higher than atmospheric pressure. There are in effect two types of rims: rims of the tube type, requiring the use of an inner tube in the tire to seal the mounted assembly, and tubeless rims which ensure the seal without requiring an inner tube. By design, a tube type rim is therefore not sealed, whereas a tubeless rim is sealed. In the case of the mounted assemblies for handling vehicles, the frequent absence of inner tubes leads to distinguishing the two types of rim for the choice of the filling component. Consequently, a mounted assembly, without an inner tube, can be inflated only in the case of a tubeless rim.

Furthermore the inventors have found that a tire, of which the internal cavity is filled with a granular filling component and is inflated with an inflation gas to a given pressure, has a vertical rigidity that is substantially equal to that of the tire, without a filling component and inflated to this same pressure, below a certain load, and a vertical rigidity that is substantially equal to that of a solid tire, above this load. In other words, such a tire behaves like a conventional inflated tire with light loads and as a solid tire with heavy loads.

Such a change in rigidity may be of particular value for uses in which there is a distinction between a dynamic running load and a static manoeuvring load, as in the case of cranes and, more generally, lifting machines. The vertical rigidity of the tire, with a granular filling component, is therefore adjusted with the aid of the fill rate and the inflation pressure, such that the tire behaves like a conventional inflated tire in the unloaded running phase and like a solid tire in the load-lifting manoeuvring phase.

According to a fourth embodiment of the invention, the interstices between the granules contain a liquid, making it possible to distribute the dissipated heat in the granular filling component by stirring the granules during use. The use of a liquid can be envisaged only in the case of a sealed rim. The liquid contained in the interstices may also be inserted between the granules, in the zones of intergranular contact, depending on the contact pressures between the granules. In the interstices between the granules, a gaseous phase may coexist with the liquid phase.

This liquid has a dual function. The liquid has a first function of distributing the heat in the granular filling component, when the granules are stirred during use, that is to say during the relative movements of the grains when the tire is running. The second function of the liquid is to provide lubrication between the grains to reduce the intergranular friction and, consequently, the heat generated by friction.

The choice of the liquid may promote one or the other of the functions. Water or, more generally, an aqueous solution capable of remaining in the liquid phase throughout the temperature range of use of the tire, is an example of an effective coolant with respect to heat distribution. A lubricating liquid, such as an oil, promotes intergranular sliding and consequently limits the dissipation of energy by friction.

The invention also relates to a method for manufacturing a mounted assembly consisting of a tire, of which the internal cavity is filled with a granular filling component, and a rim.

The method for producing such a mounted assembly comprises the following steps:

a) installing a cylindrical shroud with a diameter equal to the diameter of the rim, so as to close off the internal cavity of the tire, filling the internal cavity of the tire with the granular filling component with the aid of a filling means, and compacting the granules, so as to obtain the intended fill rate and to form an intermediate assembly comprising the tire, filled with the granular filling component, and the shroud.

b) installing the intermediate assembly on a transfer frame comprising a transfer means and the rim onto which the tire, filled with the granular filling component, is to be mounted.

c) transferring the tire, filled with the granular filling component, from the shroud onto the rim, by application of a force parallel to the axis of revolution of the tire by the transfer means, so as to form the mounted assembly.

In a first step, a cylindrical shroud with a diameter equal to the diameter of the rim is placed so as to close off the internal cavity of the tire. The diameter of the rim is the diameter at the seat, that is to say the diameter of the portion of the rim in contact with the radially internal portions of the tire. The use of a cylindrical shroud with a diameter equal to the diameter of the rim makes it possible to obtain the intended fill rate.

With the aid of an appropriate filling means, for example of the pump type, the internal cavity of the tire is filled with the granular filling component through the cylindrical shroud.

The compacting of the granules is carried out with an appropriate means, applying a pressure to the granular filling component, for example a piston. This compacting, a function of the nature and the size of the granules, makes it possible to obtain the intended fill rate.

After filling and compacting, the result is therefore an intermediate assembly comprising the tire, filled with the granular filling component, and the shroud.

The second step consists in placing the intermediate assembly on a transfer frame comprising a transfer means and the rim. The intermediate assembly is positioned so that the cylindrical shroud is coaxial with the rim on which the tire is to be mounted, filled with the granular filling component. One means of transfer is, for example, an annular structure, exerting on the tire a force parallel to the axis of revolution of the tire, so as to transfer it from the shroud to the rim.

The third and last step is the transfer of the tire, filled with the granular filling component, from the shroud to the rim, by application of a force parallel to the rotation axis of the tire by the transfer means, so as to form the mounted assembly.

The advantage of producing an intermediate assembly, consisting of a tire mounted on a cylindrical shroud, is to decouple the filling means and the means for transfer to the rim. This allows a flexibility in the production of mounted assemblies according to the invention: several intermediate assemblies can be produced in parallel and stored, before being transferred to the transfer means, in order to mount the tires on their rims.

This method relates to the production of a mounted assembly with a straightforward granular filling component without the addition of a supplementary component as described above: powder, inflation gas, liquid.

BRIEF DESCRIPTION OF DRAWINGS

The features of the invention will be better understood with the aid of the description of the appended FIGS. 1 to 3C.

DETAILED DESCRIPTION OF SPECIFIC EMBODIMENTS

FIGS. 1A to 3C are not shown to scale in order to make them easier to understand.

Figure 1A:
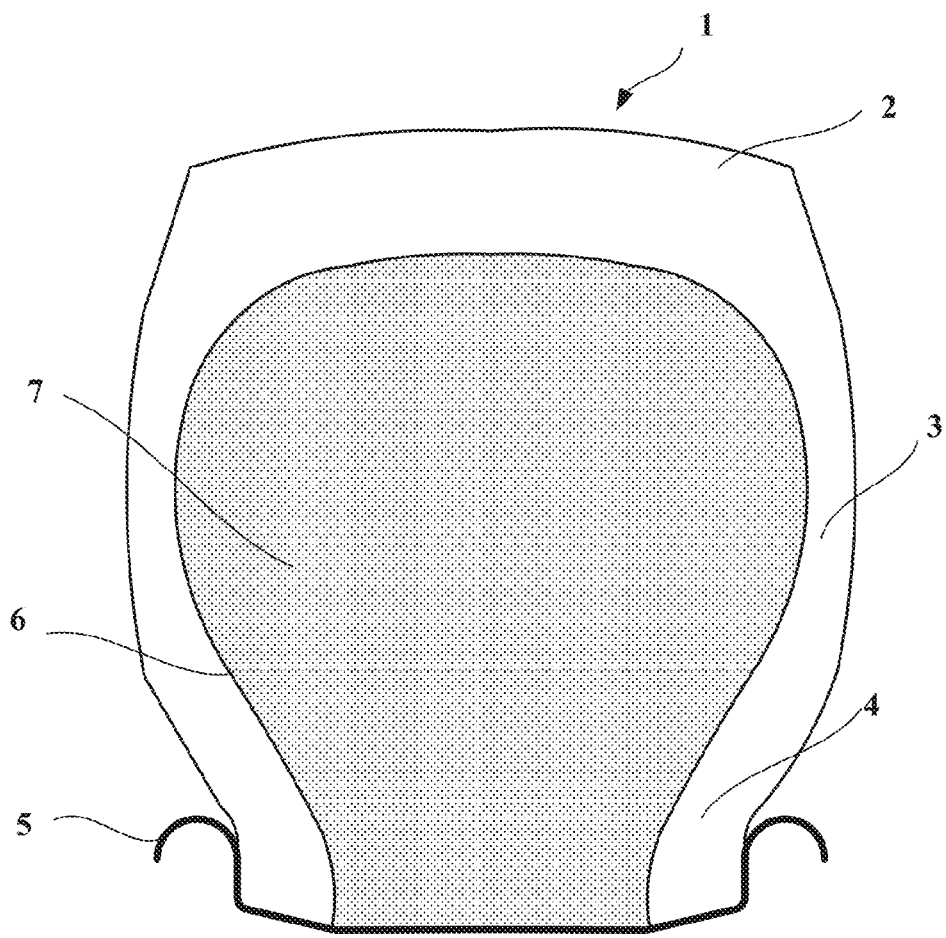
FIG. 1A shows a view in section in a meridian plane of a mounted assembly consisting of a tire, of which the internal cavity is filled with a granular filling component, mounted on a rim.

FIG. 1A shows a meridian section of a tire 1, along a plane passing through the axis of revolution of the tire, mounted on a rim 5. The tire 1 comprises a tread 2 designed to come into contact with a ground, two sidewalls 3 extending radially inwards from the ends of the tread 2, and two beads 4 extending the sidewalls 3 radially inwards and in contact with the rim 5. The tread 2, the two sidewalls 3, the two beads 4 and the rim 5 delimit an internal cavity 6. The internal cavity 6 contains a granular filling component 7 consisting of granules.

Figure 1B:
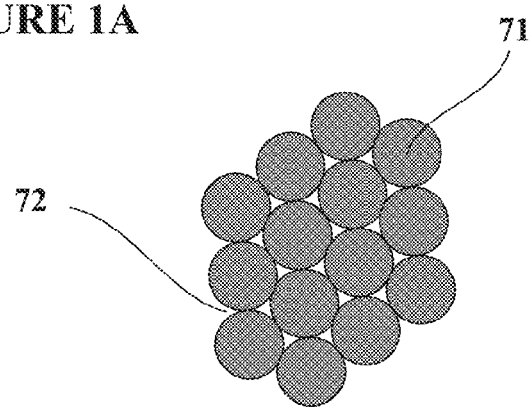
FIG. 1B shows an enlarged view of the granular filling component.

FIG. 1B is an enlarged view of the granular filling component. The granules 71 are separated by interstices 72 containing at least one gas.

Figure 2:
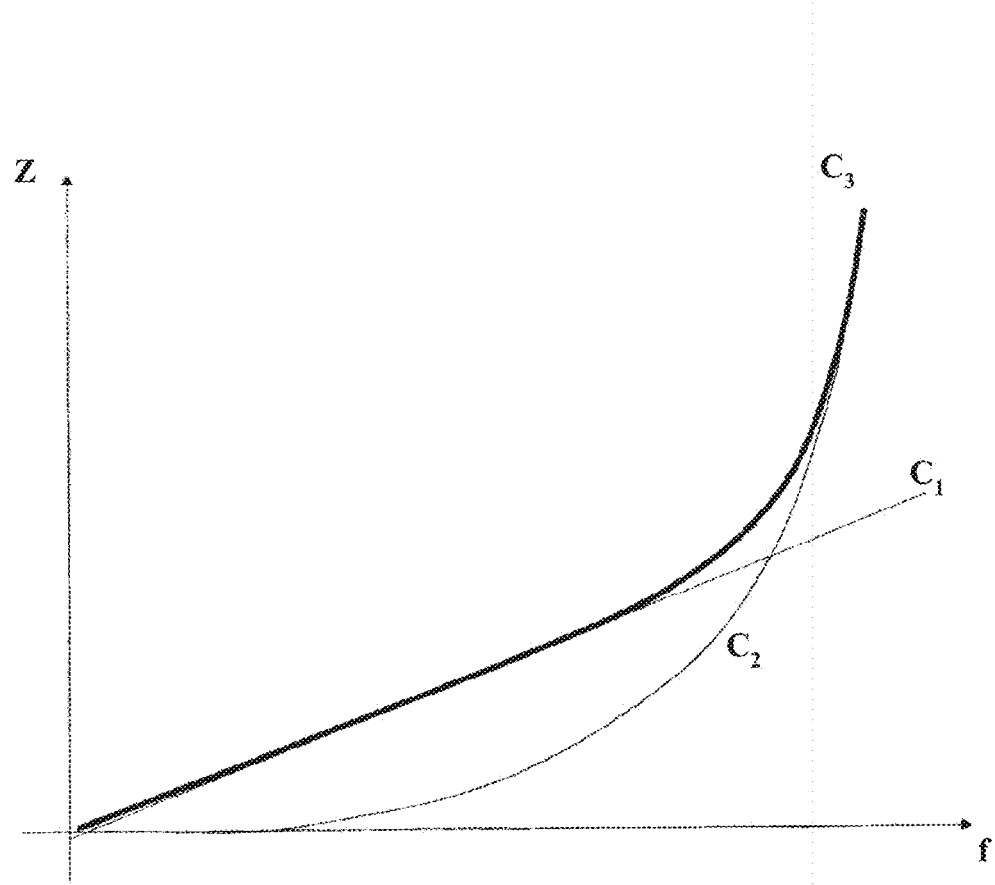
FIG. 2 shows curves of the change in load as a function of the flexing of a tire.

FIG. 2 shows three curves $C_1$, $C_2$ and $C_3$ of change in the load Z applied to a tire as a function of the flexing f of the tire. The slope of the straight line tangential to a curve C, at a point (Z, f), defines the vertical rigidity of the tire at this point. The curve $C_1$ shows the change in the load Z as a function of the flexing f for a tire, with no granular filling component and inflated to a pressure P. The curve $C_2$ shows the change in the load Z as a function of the flexing f for a tire, with a granular filling component but not inflated. The curve $C_3$ represents the change in the load Z as a function of the flexing f for a tire, with a granular filling component and inflated to the same pressure P as that of the curve $C_1$. The curve $C_3$ is indistinguishable from the curve $C_1$, characteristic of a conventional inflated tire, for load values below a transition value, then, after a transition zone, is indistinguishable from the curve $C_2$, characteristic of a solid tire.

Figure 3A:
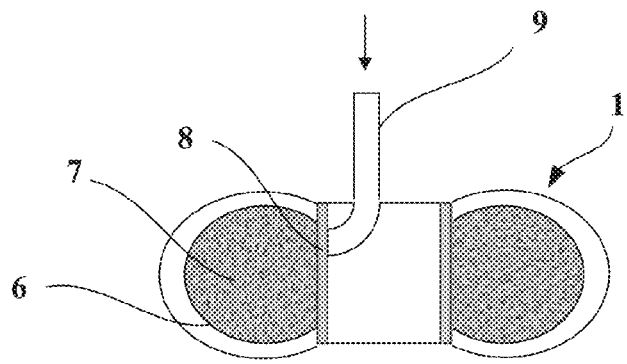
FIGS. 3A to 3C show the steps of producing a mounted assembly according to the invention.
Figure 3B:
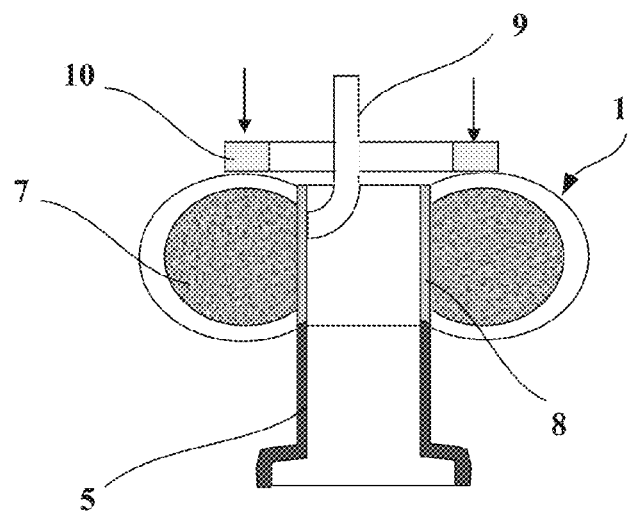
Figure 3C:
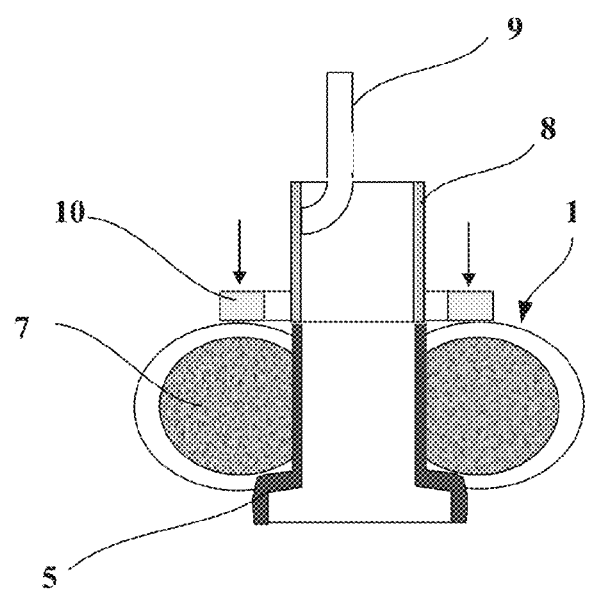

FIGS. 3A to 3C show schematically the steps of the method for producing a mounted assembly according to the invention.

FIG. 3A shows the first step of the method. A cylindrical shroud 8 with a diameter equal to the diameter of the rim is put in place so as to close off the internal cavity 6 of the tire 1. The filling of the internal cavity 6 of the tire 1, closed off by the cylindrical shroud 8, is then carried out with the granular filling component 7 with the aid of a filling means 9 passing through the cylindrical shroud 8. The granules are compacted with the aid of an appropriate means (not shown) so as to obtain the intended fill rate. The result of the second step is the formation of an intermediate assembly 1, 7, 8.

FIG. 3B illustrates the second step of the method which consists in placing the intermediate assembly 1, 7, 8 on a transfer frame comprising a transfer means 10 and the rim 5 on which the tire 1 is to be mounted.

Finally, FIG. 3C illustrates the third step of the method which is the transfer of the tire 1, filled with the granular filling component 7, from the shroud 8 to the rim 5, by the application of a force parallel to the axis of revolution of the tire by the transfer means 10 so as to form the mounted assembly 1, 7, 5.

The inventors have produced a mounted assembly according to the invention for use on a handling vehicle and according to the filling method described. The granular filling component used consists of granules of retreading powder originating from the recycling of treads during the retreading of tires. The interstices between the powder granules are filled with atmospheric air. The fill rate obtained is equal to approximately 0.85. Tests have also been carried out according to the various embodiments described: with inflation air at the pressure of use of the tire, with a liquid such as water, and with a carbon black-based powder.

The invention claimed is:

1. A method for producing a mounted assembly, the mounted assembly comprising:
   a tire mounted on a rim, the tire comprising a tread designed to come into contact with a ground, two sidewalls extending radially inwards from the ends of the tread, and two beads extending the sidewalls radially inwards and in contact with the rim,
   the tread, the two sidewalls, the two beads and the rim delimiting an internal cavity, the internal cavity containing a filling component comprising at least one incompressible solid element,
   wherein the filling component is a granular filling component consisting of granules at least partly separated from one another by interstices containing at least one gas,
   the fill rate, which is the ratio between the total volume of the granules, the total of the elementary volumes of the granules, and the volume of the internal cavity, is at least equal to 0.8, and the method comprises the following steps:
   a) installing a cylindrical shroud with a diameter equal to the diameter of the rim, so as to close off the internal cavity of the tire, filling the internal cavity of the tire with the granular filling component with the aid of a filling means, and compacting the granules, so as to obtain the intended fill rate and to form an intermediate assembly comprising the tire, filled with the granular filling component, and the shroud;
   b) installing the intermediate assembly on a transfer frame comprising a transfer means and the rim onto which the tire, filled with the granular filling component, is to be mounted; and
   c) transferring the tire, filled with the granular filling component, from the shroud onto the rim, by application of a force parallel to the axis of revolution of the tire by the transfer means, so as to form the mounted assembly.

* * * * *